United States Patent [19]

Mitzner et al.

[11] Patent Number: 4,819,918

[45] Date of Patent: Apr. 11, 1989

[54] APPARATUS FOR THE PROTECTION OF A LIQUID AGAINST THE EFFECTS OF OXYGEN FROM THE SURROUNDINGS

[75] Inventors: Horst Mitzner, Viersen; Franz Dellen, Monchen-Gladbach, both of Fed. Rep. of Germany

[73] Assignee: Rheinische Maschinenfabrik & Eisengiesserei, Anton Roeper GmbH & Co. KG, Viersen, Fed. Rep. of Germany

[21] Appl. No.: 144,568

[22] Filed: Jan. 12, 1988

[30] Foreign Application Priority Data

Jan. 13, 1987 [DE] Fed. Rep. of Germany ....... 3711701

[51] Int. Cl.⁴ ............................................... C22B 7/00
[52] U.S. Cl. ......................................... 266/207; 75/96; 266/211
[58] Field of Search ..................... 75/96; 266/207, 211

[56] References Cited

U.S. PATENT DOCUMENTS

| | | | |
|---|---|---|---|
| 3,417,808 | 12/1968 | Rosenberg | 75/96 |
| 3,630,267 | 12/1971 | Hlinka | 75/96 |
| 3,868,987 | 3/1975 | Galey | 75/96 |
| 4,430,121 | 2/1984 | Shima | 75/96 |

Primary Examiner—Peter D. Rosenberg
Attorney, Agent, or Firm—Scully, Scott, Murphy & Presser

[57] ABSTRACT

The subject matter of the invention is constituted by a method and an apparatus for the protection of a liquid in a container against the effects of atmospheric oxygen by the use of a fluid, which is placed as a barrier layer between the liquid to be protected and the atmosphere. The protective fluid is a liquid whose specific gravity is less than the specific gravity of the liquid to be protected and has a volume which is kept constant for the desired period of operation. The liquid which is protected is taken from the container under the protective liquid.

3 Claims, 1 Drawing Sheet

APPARATUS FOR THE PROTECTION OF A LIQUID AGAINST THE EFFECTS OF OXYGEN FROM THE SURROUNDINGS

BACKGROUND OF THE INVENTION.

The invention relates to a method for the protection of a liquid stored in a container against the effects of atmospheric oxygen and to an apparatus for carrying out the method of the invention.

The invention is more particularly concerned with the protection of molten metal which would be liable to premature oxidation if atmospheric oxygen were to gain access to it.

There has already been a proposal to use a protective gas under pressure for the protection of molten metal against the atmospheric oxygen.

However this method involved the replenishment of protective gas to make good losses of the gas into the atmosphere and furthermore job environment as impaired Moreover any readjustment of the liquid level, for example that of molten metal, was complex owing to the compressibility of gases. A further disadvantage in connection with protective gas operations is that on actuation of the safety circuit all gage pressure in the machines and plant has to be let off (to comply with industrial safety regulations). This letting off of the gas under pressure may impair or completely override the protective effect of the gas. A rapid discharge of the pressure, as required by the regulations, also leads to an uncontrolled motion of the liquid and splashing. In those cases in which the liquid to be protected has to be held at a raised temperature, the protective gas tends to prevent the transmission of heat.

SHORT SUMMARY OF THE PRESENT INVENTION.

One object of the present invention is to so improve upon a method of the type in question that the disadvantages noted above are avoided.

A further aim of the invention is to provide a generally simple but reliable method with which a liquid, more especially a mass of molten metal, be protected against the access of atmospheric oxygen.

In accordance with a further development of the invention a convenient is to be provided for carrying out a form of the method of the invention.

Further features of the method and apparatus of the invention will be seen from the patent claims and the following detailed account referring to the diagrammatic drawings.

LIST OF THE SEVERAL VIEWS OF THE FIGURES

DETAILED ACCOUNT OF THE INVENTION

Figure 1:
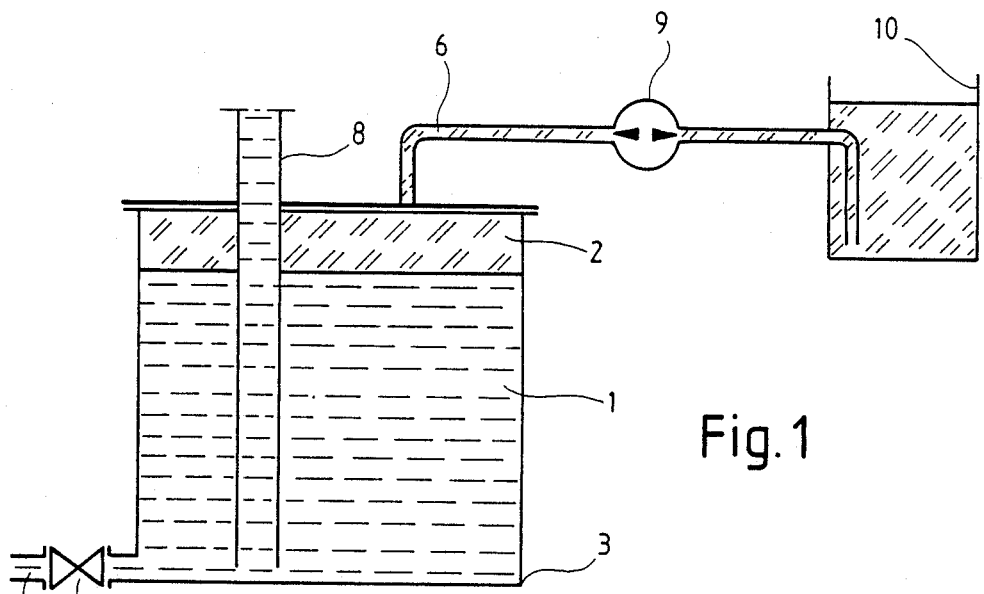
FIG. 1 shows a device in accordance with the invention, which represents a closed system for performing the method in accordance with the invention.

In both cases the apparatus comprises an uprightly mounted container 3 in which the liquid 1 is placed which is to be protected against the effects of atmospheric oxygen. The liquid to be protected may be more especially a mass of molten metal which would oxidize if oxygen were to have access to it, this being something to be prevented. The molten metal 1 is introduced into the liquid container 3 at a point near its bottom through a supply line 4 which has an integral valve 5 in order to be able to control the flow rate. The valve may be simply of the on and off type or it may be one which is able to be continuously varied in accordance with a control signal. The access of atmospheric oxygen or oxygen from the surroundings to the liquid to be protected 1 is prevented by a protective liquid 2 whose specific weight is less than that of the liquid to be protected so that the protective liquid 2 floats on the liquid 1 to be protected, that is to say more especially the melt. Since the protective liquid 2 like the liquid to be protected 1 makes full contact with the inner wall face, the liquid to be protected will not be reached by any oxygen from the surroundings.

In both cases the removal of the melt to be protected 1 takes place through the protective liquid 2, for which purpose a riser tube 8 extends from point near the floor of the container to a level above the upper rim of the container The upper and lower ends of the riser tube 8 are shown as being open, although it is naturally possible to have conventional fittings such as valves, more especially at the top end. The removal of melt 1 may generally take place in such a manner that the melt within the container 3 is put under pressure or the upper end of the riser tube is connected with a suction device such as a suction pump.

Figure 2:
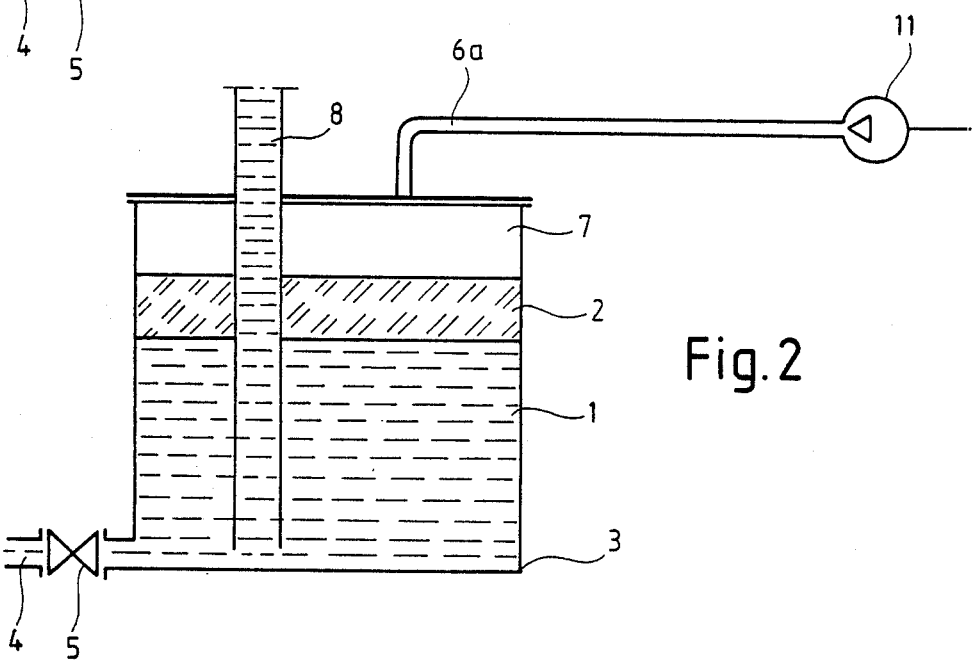
FIG. 2 shows an apparatus of the invention comprising an open system for performing the method of the invention.

In both these cases the top end of the container 3 is closed by a cover 3a to provide a sealing effect which in the case of figure 1 is liquid-tight and in the case of FIG. 2 is liquid- and gas-tight since there are suitable seals between the container 3 as such and the cover 3a.

In the case of the design of FIG. 1 the protective liquid 2 is supplied through a second supply pipe 6 into the head space of the container 3, that is to say into the space right under the cover 3a and above the liquid 1 to be protected. The supply of the protective liquid from a supply tank 10 into the container 3 is ensured by way of a conventional metering pump 9 integrated in the pipe 6. Dependent on the amount of protective liquid pumped into the container 3 it is possible to adjust the level of the liquid to be protected 1 and the removal of the liquid to be protected. It is a question of a closed system, in which the liquid 1 to be protected 1 is covered by the protective liquid to prevent the access of oxygen, is adjusted in level and kept under pressure and, in the case of the use of a protective liquid 2 with a low conductivity, is held at a conditioning temperature. The design of FIG. 2 is an open system in which the protective liquid 2 also covers the liquid to be protected and possibly holds it at the desired conditioning temperature if this is desired, while on the other hand the regulation of level and pressure is ensured by any suitable gaseous medium 7. While in the device in accordance with FIG. 1 the protective liquid 2 is pumped to and fro between the supply tank 10 and the head space of the container 3 by means of the metering pump 9, in the apparatus of FIG. 2 the pressure in the head space is set by an automatic pressure controller 11 in the supply pipe 6a for the gaseous medium 7, inasfar as in accordance with the pressure set in the automatic pressure controller 11 gaseous medium is taken from a supply vessel and supplied into the head space or the pressure is lowered by letting off gaseous medium such as air.

We claim:

1. An apparatus for storing molten metal including an uprightly mounted container in which the molten metal is placed, said molten metal being protected by a protective liquid against oxygen from the surroundings, the specific weight of said protective liquid being less than that of said molten metal; the container including a supply line having an integral valve near the bottom of the container and connected with a source for molten metal; the container 3 including further a riser tube in a vertical position having one open end near said bottom of the container and ending with another open end above a top plate of said container, said top plate sealing the container at its upper end; the container further including a supply pipe introduced through said top plate into a space between said top plate and an upper surface of the molten metal and including a pressure controller to introduce a gaseous medium or the protective liquid into said space.

2. An apparatus as claimed in claim 1, wherein the pressure controller is a metering pump for pumping said protective liquid into the space between the top plate and the upper surface of the molten metal.

3. An apparatus as claimed in claim 1, wherein the pressure controller is an automatic pressure controller defining the pressure of a gaseous medium in a part of said space, which part is surrounded by said top plate, the protective liquid and the upper part of the wall of the container.

* * * * *